United States Patent
Masleid

(10) Patent No.: US 8,166,438 B2
(45) Date of Patent: Apr. 24, 2012

(54) LOW RC LOCAL CLOCK DISTRIBUTION

(75) Inventor: Robert P. Masleid, Monte Sereno, CA (US)

(73) Assignee: Oracle America, Inc., Redwood City, CA (US)

(\*) Notice: Subject to any disclaimer, the term of this patent is extended or adjusted under 35 U.S.C. 154(b) by 581 days.

(21) Appl. No.: 12/361,027

(22) Filed: Jan. 28, 2009

(65) Prior Publication Data

US 2010/0188130 A1 Jul. 29, 2010

(51) Int. Cl.
*G06F 17/50* (2006.01)
*H03L 7/085* (2006.01)

(52) U.S. Cl. ........ 716/119; 716/118; 716/122; 716/137; 703/13; 703/14; 327/154

(58) Field of Classification Search .................. 716/119, 716/122, 137; 703/13, 14; 327/154
See application file for complete search history.

(56) References Cited

U.S. PATENT DOCUMENTS

| 5,396,092 A * | 3/1995 | Peek .......................... 257/249 |
| 6,161,215 A * | 12/2000 | Hollenbeck et al. .......... 716/137 |
| 6,433,605 B1 * | 8/2002 | Zhang .......................... 327/291 |
| 6,941,532 B2 * | 9/2005 | Haritsa et al. ................. 716/114 |
| 2008/0229265 A1 * | 9/2008 | Bueti et al. ....................... 716/6 |
| 2009/0064067 A1 * | 3/2009 | Liu et al. ........................... 716/6 |
| 2010/0229142 A1 * | 9/2010 | Masleid et al. ................. 716/10 |

\* cited by examiner

*Primary Examiner* — Stacy Whitmore
*Assistant Examiner* — Magid Dimyan
(74) *Attorney, Agent, or Firm* — Osha • Liang LLP

(57) ABSTRACT

A system includes an input device, an output device, a printed circuit board, and a semiconductor device. The semiconductor device includes a semiconductor die. The semiconductor die includes a clock distribution network that distributes a primary clock signal. The clock distribution network includes a low RC local clock distribution structure. The low RC local clock distribution structure includes a conductor, a first clock signal incident on the conductor, a local gain buffer pair that receives the first clock signal and outputs a second clock signal corresponding to the first clock signal, and a shorting bar that shorts the second clock signal to a plurality of conductors.

20 Claims, 3 Drawing Sheets

US 8,166,438 B2

LOW RC LOCAL CLOCK DISTRIBUTION

BACKGROUND OF INVENTION

The quality of the distribution of clock signals within a semiconductor device impacts the frequency performance of the semiconductor device. Modern semiconductor devices have poor matching between individual devices or wires, yet it is desirable to minimize the skew among the numerous branches of a clock distribution network. Further, minimizing the delay through the clock distribution network reduces error. Roughly half of the total clock distribution delay is due to wire propagation delay.

SUMMARY OF INVENTION

According to one aspect of one or more embodiments of the present invention, a method of producing a low RC local clock distribution structure includes: arranging a plurality of buffers in a local gain buffer pair configuration, connecting a conductor corresponding to a clock signal to an input of the local gain buffer pair, connecting a shorting bar to an output of the local gain buffer pair, and connecting a plurality of conductors to the shorting bar.

According to one aspect of one or more embodiments of the present invention, a low RC skew local clock distribution structure includes: a conductor, a first clock signal incident on the conductor, a local gain buffer pair that receives the first clock signal and outputs a second clock signal corresponding to the first clock signal, and a shorting bar that shorts the second clock signal to a plurality of conductors.

According to one aspect of one or more embodiments of the present invention, a semiconductor device includes: a semiconductor die, and a clock distribution network that distributes a primary clock signal within the semiconductor die. The clock distribution network includes a low RC local clock distribution structure. The low RC local clock distribution structure includes: a conductor, a first clock signal incident on the conductor that is a derivative of the primary clock signal, a local gain buffer pair that receives the first clock signal and outputs a second clock signal corresponding to the first clock signal, and a shorting bar that shorts the second clock signal to a plurality of conductors.

According to one aspect of one or more embodiments of the present invention, a system includes: an input device, an output device, a printed circuit board, and a semiconductor device that includes a semiconductor die. The semiconductor die includes a clock distribution network that distributes a primary clock signal. The clock distribution network includes a low RC local clock distribution structure. The low RC local clock distribution structure includes: a conductor, a first clock signal incident on the conductor, a local gain buffer pair that receives the first clock signal and outputs a second clock signal corresponding to the first clock signal, and a shorting bar that shorts the second clock signal to a plurality of conductors.

Other aspects of the present invention will be apparent from the following description and the appended claims.

DETAILED DESCRIPTION

Figure 1:
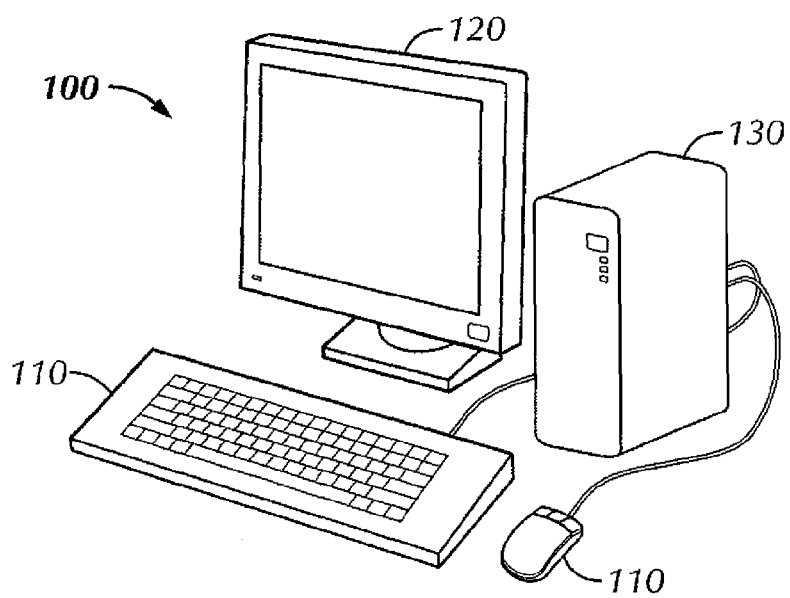
FIG. 1 shows a system in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a system in accordance with one or more embodiments of the present invention. A system 100 includes an input device 110, an output device 120, and a mechanical chassis 130. The mechanical chassis 130 includes a printed circuit board, a network device, and a storage device (not shown).

Figure 2:
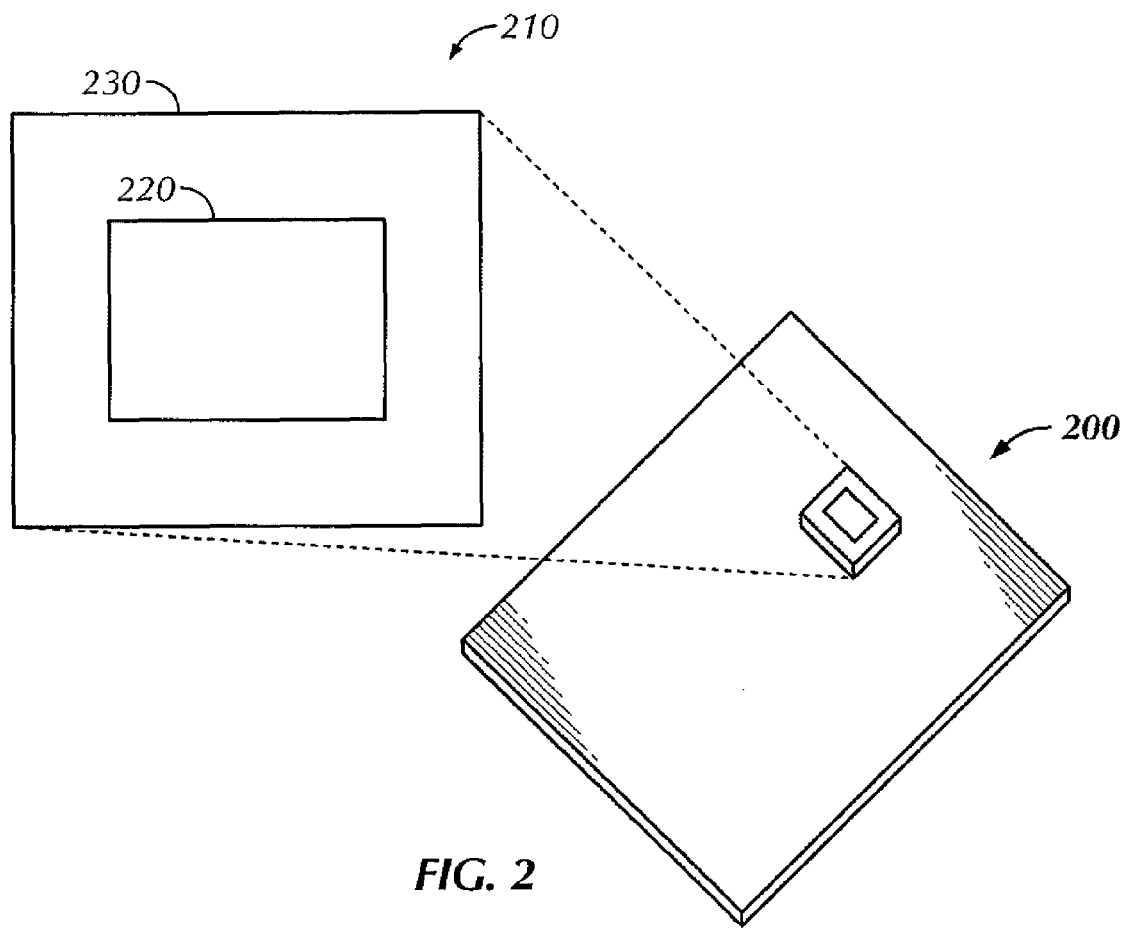
FIG. 2 shows a printed circuit board that includes one or more semiconductor device(s) that each includes one or more semiconductor die in accordance with one or more embodiments of the present invention.

FIG. 2 shows a printed circuit board in accordance with one or more embodiments of the present invention. A printed circuit board ("PCB") 200 includes one or more semiconductor device(s) 210. Each semiconductor device 210 includes one or more semiconductor die 220 encapsulated in a mechanical package 230. The mechanical package 230 serves as an electrical and mechanical interface between the die 220 and the PCB 200.

The PCB 200 provides one or more external clock signals to the semiconductor device 220. The mechanical package 230 provides the external clock signal(s) to the die 220. The die 220 generates one or more internal clock signals that are a function of the provided external clock signal(s). The internal clock signals are typically the most heavily loaded, the most widely distributed, and the fastest signals within the die 220. As such, clock distribution networks are used to provide the clock signals to the proper loads within the die.

A given clock distribution includes three broad layers that serve to distribute the clock within the semiconductor die. The tree layer includes the clocks routes that span a large area of the die. The grid layer includes the clock routes to the individual clock users. The local layer includes the clock routes to the actual flip-flops and latches. The grid and local clock portions of the clock distribution have multiple clock users connected at irregular intervals along their conductors. As a consequence, the grid and local clock portions of the clock distribution expose the clock users to RC clock skew.

The RC clock skew changes with tolerance, voltage, and intra-die variation. Resistance values can vary by ±30% as a result of tolerances relating to the fabrication of metal thickness, e.g., the chemical-etching tolerance involved in the grinding of each metal layer. Relaxation, i.e., back-annotation of the RC into the timing checks, cannot recover the tolerance portion the RC skew. Further, path circuit delays will dynamically change in relative value due to dynamic voltage frequency scaling. While intra-die variation is a smaller contributor to RC skew, values of approximately 10% are common in practice.

The RC clock skew impacts the physical design of the semiconductor device. Structural skew in the clock distribution cancels in symmetrical and matched compositions such as bit-slice-only paths in data path structures. Multi-bit-slice paths and control-data paths do not enjoy this cancellation and encounter the structural skew.

The RC clock skew impacts the logic design of the semiconductor device. The static portion of the skew can be extracted from layout and back-annotated into the timing tools used. However, this occurs so late in the composition process that it is typically too late for the RTL ("Register Transfer Level") designer to effectuate a change. Accordingly, grid and local clock distribution structures are proposed that decrease clock-user visible RC skew for the entire grid and local clock distribution. The fan-out of a typical CMOS application is defined as the load capacitance divided by the input capacitance, $C_{load}/C_{in}$. Generally, fan-out 4 ("FO4") represents the delay of an inverter driven by an inverter four times smaller than itself, and itself driving an inverter four times larger. Put another way, the minimum delay is achieved when the load is driven by a chain of inverters, each successive inverter approximately four times larger than the previous one. However, because new process generations are inherently faster, it is difficult to compare the performance of one circuit at one technology node to another circuit at another technology node. Thus, FO4 is an important design metric because circuit design can be described in a process independent manner.

All VLSI conductors have lengths and loads over which the RC of the conductor is "negligible." Here, "negligible" has three functional meanings, each corresponding to a time and length characteristic of an application.

A shorting bar has an RC of approximately 0.1×FO4 including wire and loads. The slew rate effect on the delay of driven stages is undetectable. Load coupling can pull together multiple drivers of this wire together by over-loading early drivers and under-loading late drivers. Load coupling is effective to approximately 0.5×FO4.

A short wire has an RC of approximately 1.0×FO4 including wire and loads. The slew rate effect on the delay of driven stages is minor. Load coupling is generally ineffective among multiple drivers of this wire because drivers are largely shielded from large portions of the load and each other by the wire resistance.

A long wire has an RC of approximately 10+×FO4 including wire and loads. The slew rate effect on the delay of driven stages is major, but delay still scales with voltage $V_{dd}$ like static logic. Load coupling is completely ineffective. The near end transition is completed before the far end transition even begins.

As such, a low RC local clock distribution can be assembled hierarchically. Shorting bars may be used to stitch together side-by-side or nearby users with their own local buffer(s). Short wires may be used to connect local buffers to a higher level buffer/clock gate. Long wires are confined to the clock distribution tree, before the grid. However, clock distributions incorporate large capacitance gain between a PLL ("Phase Locked Loop") and the state elements. As such, additional gain stages are required to allow for clock gating, mal-distribution of the clock load, and clock wiring capacitance. Biasing the transistors for efficient delay per gain is essential to minimizing the clock distribution delay. The delay per gain can be minimized through the use of FO4 design and the use of local gain.

FO4 design keeps transistors in the high-trans-conductance region of the I-V curve. Prior to discussing local gain in detail, it is important to understand the ways in which wire resistance destroys gain. A slow input, transition wastes device width on crowbar and moves the receiver from FO4 operation to FO10 operation. Output shielding makes the driver less effective, requiring a larger driver and more input gain to support it. However, local gain prevents wire resistance from degrading the gain.

Figure 3:
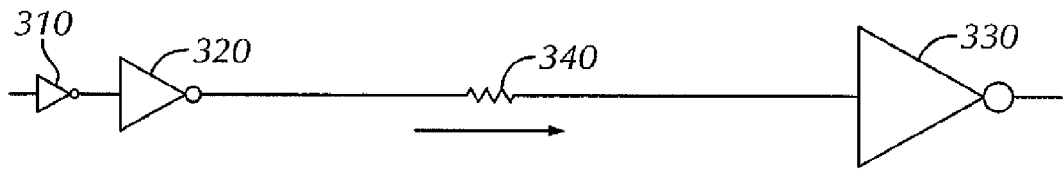
FIG. 3 shows a conventional FO4 implementation using centralized buffers.

FIG. 3 shows a conventional FO4 implementation using centralized buffers. Buffer 310 drives buffer 320, and buffer 320 drives buffer 330 through wire resistance 340. Buffer 330 is four times larger than buffer 320, and buffer 320 is four times larger than buffer 310. Buffer 330 is placed nearest to the load while buffer 310 and buffer 320 are a distance from the load. As a result, wire resistance 340 plays an important role in the RC of the configuration depicted.

Figure 4:
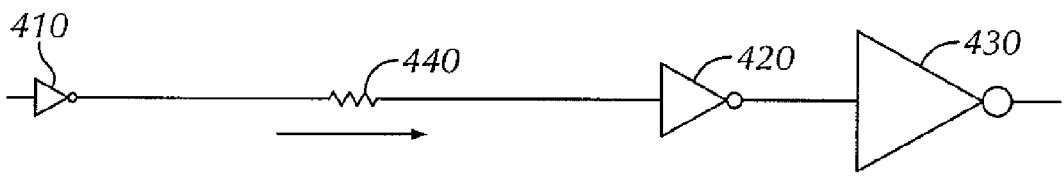
FIG. 4 shows a local gain FO4 implementation in accordance with one or more embodiments of the present invention.

FIG. 4 shows a local gain FO4 implementation in accordance with one or more embodiments of the present invention. Buffer 410 drivers buffer 420 through wire resistance 440, and buffer 420 drives buffer 430. In contrast to the conventional FO4 implementation depicted in FIG. 3, buffer 420 and buffer 430 are placed as close to the load as is practical. Because of this local gain configuration, the current through wire resistance 440 is four times smaller than the current through wire resistance 340 at a fixed wire size. As such, wire resistance 440 is four times less important than wire resistance 340 at a fixed wire size. Thus, the RC of the configuration depicted in FIG. 4 is four times smaller than the RC of the configuration depicted in FIG. 3 at a fixed wire size.

Figure 5:
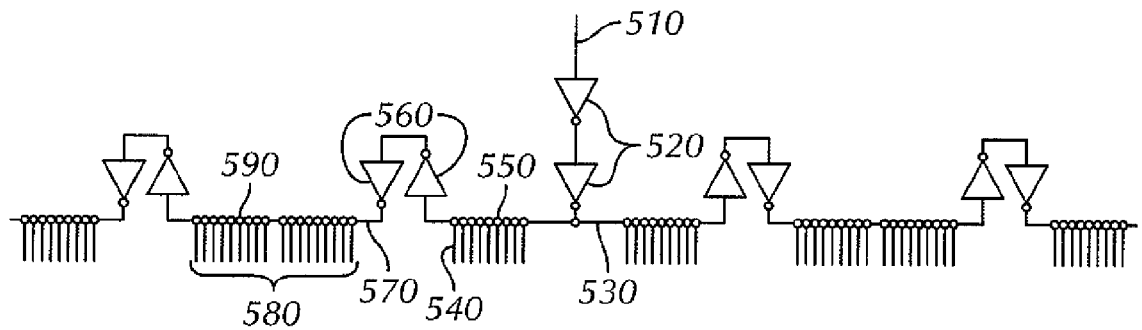
FIG. 5 shows a portion of a first low RC clock distribution structure in accordance with one or more embodiments of the present invention.

FIG. 5 shows a portion of a first low RC clock distribution structure in accordance with one or more embodiments of the present invention. A first clock 510 is provided to a local gain buffer pair 520. The local gain buffer pair 520 corresponds to load side buffers 420 and 430 in the exemplary local gain FO4 configuration depicted in FIG. 4. The output of local gain buffer pair 520 is a second clock 530 that is provided to a plurality of clocks 540 via a shorting bar 550. The shorting bar 550 provides the second clock 530 to local gain buffer pair 560. The output of local gain buffer pair 560 is a third clock 570 that is provided to a plurality of clocks 580 via a shorting bar 590. One of ordinary skill in the art will appreciate that the clock signal can be further propagated in a like manner in accordance with one or more embodiments of the present invention.

Figure 6:
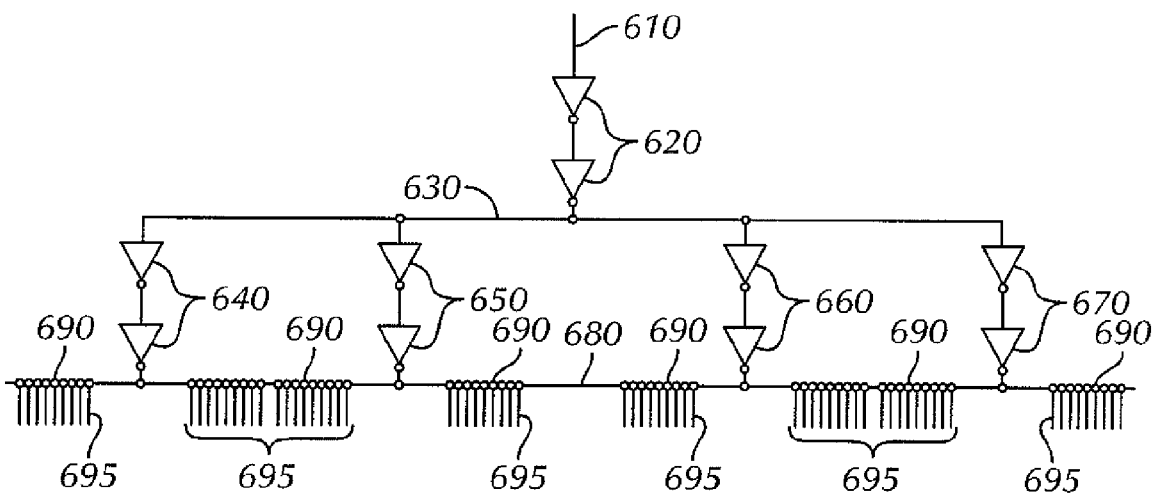
FIG. 6 shows a portion of a second low RC clock distribution structure in accordance with one or more embodiments of the present invention.

FIG. 6 shows a portion of a second low RC clock distribution structure in accordance with one or more embodiments of the present invention. A first clock 610 is provided to a local gain buffer pair 620. The output of the local gain buffer pair 620 is a second clock 630 that is provided to four loads, local gain buffer pairs 640, 650, 660, and 670. The output of the local gain buffer pairs 640, 650, 660, and 670 is a third clock 680 that is provided to a plurality of shorting bars 690 that each shorts the third clock 680 to a plurality of clocks 695, e.g., eight groups of nine conductors, each of which is a clock signal.

The shorting bar 690 is effective if the skew from the last common ancestor, e.g., the second clock 630, plus the structural skew due to the RC in the second clock 630 plus the structural skew due to the RC in the third clock 680 is much less than the transition time of the shorted node, e.g., the third clock 680. The shorting bar 690 is not effective if the skew from the last common ancestor is greater than the shorted node transition time, the skew between the driver inputs is greater than the shorted node transition time, or the sum of the RC and the skew is greater than the shorted node transition time. One of ordinary skill in the art will appreciate that other configurations of a low RC clock distribution structure can be achieved through the use of FO4 design and local gain in accordance with one or more embodiments of the present invention.

Figure 7:
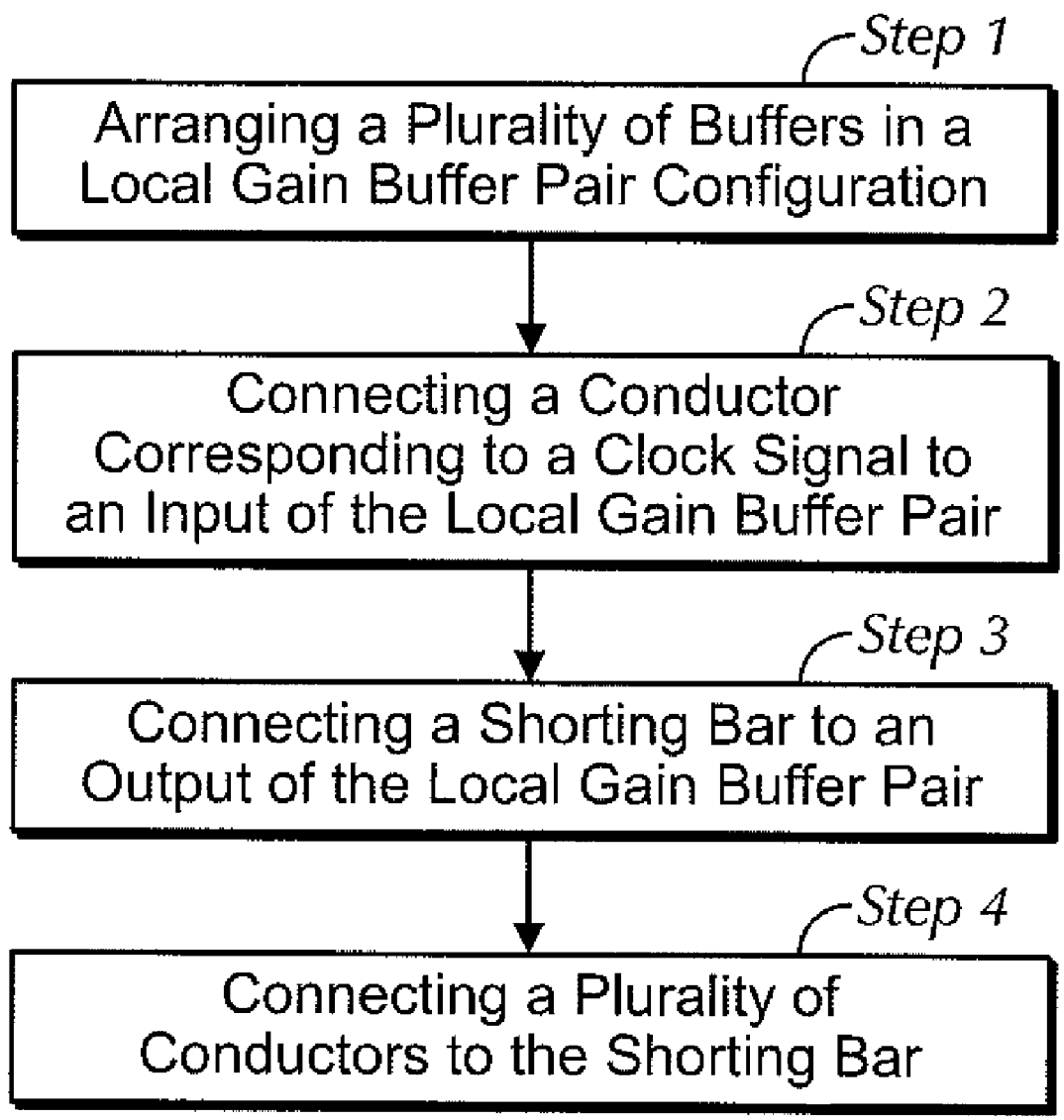
FIG. 7 shows a method of producing a low RC local clock distribution structure in accordance with one or more embodiments of the present invention.

FIG. 7 shows a method of producing a low RC local clock distribution structure in accordance with one or more embodiments of the present invention. In Step 1, a plurality of buffers are arranged in a local gain buffer pair configuration. In Step 2, a conductor corresponding to a clock signal is connected to an input of the local gain buffer pair. In Step 3, a shorting bar is connected to an output of the local gain buffer pair. In Step 4, a plurality of conductors are connected to the shorting bar.

Advantages of one or more embodiments of the present invention may include one or more of the following.

In one or more embodiments of the present invention, the low RC clock distribution structure reduces clock-user visible RC skew for the entire grid and local clock distribution. The local gain renders the wire resistance less important to the RC skew.

In one or more embodiments of the present invention, the low RC clock distribution structure can be assembled hierarchically using shorting bars to stitch together side-by-side or nearby users with their own local buffer(s). Short wires can connect the local buffers to a high level buffer/clock gate. Long wires are confined to the clock distribution tree, before the grid level.

In one or more embodiments of the present invention, the low RC clock distribution structure improves clock skew and slew rates across process manufacturing tolerance and dynamic voltage frequency scaling operating voltage.

In one or more embodiments of the present invention, the low RC clock distribution structure decreases logic circuit delay by decreasing the cycle fraction consumed by clock, and hold time padding.

In one or more embodiments of the present invention, the low RC clock distribution structure combined with fast repeaters on 45 degree global clock routes, satisfy the timing requirements needed for effective shorting bars. Effective shorting bars strap many more devices in parallel and reduce skew due to random device variation.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of producing a low RC local clock distribution structure comprising:
   arranging a plurality of buffers in a local gain buffer pair configuration;
   connecting a conductor corresponding to a clock signal to an input of the local gain buffer pair;
   connecting a shorting bar to an output of the local gain buffer pair; and
   connecting a plurality of conductors to the shorting bar.

2. The method of claim 1, wherein the local gain buffer pair corresponds to a second buffer and a third buffer as part of a three-stage fan-out 4 local gain configuration.

3. The method of claim 2, wherein a RC skew of the three-stage fan-out 4 local gain configuration is smaller than that of a corresponding conventional fan-out 4 configuration.

4. The method of claim 1, wherein a resistance of the conductor is smaller than that of a corresponding conductor in a conventional fan-out 4 configuration.

5. The method of claim 1, wherein the shorting bar is an effective short when a sum of a skew from a last common ancestor added to a structural skew is less than a transition time of a shorted node corresponding to the shorting bar.

6. A low RC skew local clock distribution structure comprising:
   a conductor;
   a first clock signal incident on the conductor;
   a local gain buffer pair that receives the first clock signal and outputs a second clock signal corresponding to the first clock signal; and
   a shorting bar that shorts the second clock signal to a plurality of conductors.

7. The low RC skew local clock distribution structure of claim 6, wherein the local gain buffer pair corresponds to a second and a third buffer as part of a three-stage fan-out 4 local gain configuration.

8. The low RC skew local clock distribution structure of claim 7, wherein a RC skew of the three-stage fan-out 4 local gain configuration is smaller than that of a conventional fan-out 4 configuration.

9. The low RC skew local clock distribution structure of claim 6, wherein a resistance of the conductor is smaller than that of a conventional fan-out 4 configuration.

10. The low RC skew local clock distribution structure of claim 6, wherein the shorting bar is an effective short when a sum of a skew from a last common ancestor added to a structural skew is less than a transition time of a shorted node corresponding to the shorting bar.

11. A semiconductor device comprising:
    a semiconductor die; and
    a clock distribution network that distributes a primary clock signal within the semiconductor die;
    wherein the clock distribution network comprises a low RC local clock distribution structure,
    the low RC local clock distribution structure comprises:
    a conductor,
    a first clock signal incident on the conductor that is a derivative of the primary clock signal,
    a local gain buffer pair that receives the first clock signal and outputs a second clock signal corresponding to the first clock signal, and
    a shorting bar that shorts the second clock signal to a plurality of conductors.

12. The semiconductor device of claim 11, wherein the local gain buffer pair corresponds to a second and a third buffer as part of a three-stage fan-out 4 local gain configuration.

13. The semiconductor device of claim 12, wherein a RC skew of the three-stage fan-out 4 local gain configuration is smaller than that of a conventional FO4 configuration.

14. The semiconductor device of claim 11, wherein a resistance of the conductor is smaller than that of a conventional fan-out 4 configuration.

15. The semiconductor device of claim 11, wherein the shorting bar is an effective short when a sum of a skew from a last common ancestor added to a structural skew is less than a transition time of a shorted node corresponding to the shorting bar.

16. A system comprising:
    an input device;
    an output device;
    a printed circuit board; and
    a semiconductor device comprising a semiconductor die;

wherein the semiconductor die comprises a clock distribution network that distributes a primary clock signal, the clock distribution network comprises a low RC local clock distribution structure, and the low RC local clock distribution structure comprises:

a conductor, a first clock signal incident on the conductor, a local gain buffer pair that receives the first clock signal and outputs a second clock signal corresponding to the first clock signal, and a shorting bar that shorts the second clock signal to a plurality of conductors.

17. The system of claim 16, wherein the local gain buffer pair corresponds to a second and a third buffer as part of a three-stage fan-out 4 local gain configuration.

18. The system of claim 17, wherein a RC skew of the three-stage fan-out 4 local gain configuration is smaller than that of a conventional fan-out 4 configuration.

19. The system of claim 16, wherein a resistance of the conductor is smaller than that of a conventional fan-out 4 configuration.

20. The system of claim 16, wherein the shorting bar is an effective short when a sum of a skew from a last common ancestor added to a structural skew is less than a transition time of a shorted node corresponding to the shorting bar.

* * * * *